US009505176B2

(12) United States Patent
Ederer (10) Patent No.: US 9,505,176 B2
(45) Date of Patent: Nov. 29, 2016

(54) METHOD FOR PRODUCING THREE-DIMENSIONAL COMPONENTS

(75) Inventor: Ingo Ederer, Geltendorf (DE)

(73) Assignee: VOXELJET AG, Friedberg (DE)

( * ) Notice: Subject to any disclaimer, the term of this patent is extended or adjusted under 35 U.S.C. 154(b) by 1785 days.

(21) Appl. No.: 12/669,063

(22) PCT Filed: Jul. 1, 2008

(86) PCT No.: PCT/DE2008/001073
§ 371 (c)(1),
(2), (4) Date: May 16, 2011

(87) PCT Pub. No.: WO2009/010034
PCT Pub. Date: Jan. 22, 2009

(65) Prior Publication Data
US 2012/0113439 A1    May 10, 2012

(30) Foreign Application Priority Data
Jul. 18, 2007  (DE) ........................ 10 2007 033 434

(51) Int. Cl.
| B29C 67/00 | (2006.01) |
| B22F 1/00 | (2006.01) |
| B22F 3/105 | (2006.01) |
| B22F 3/14 | (2006.01) |
(Continued)

(52) U.S. Cl.
CPC ......... *B29C 67/0092* (2013.01); *B22F 1/0059* (2013.01); *B22F 3/1055* (2013.01); *B22F 3/14* (2013.01); *C22C 1/1084* (2013.01); *C22C 29/06* (2013.01); *C22C 32/0052* (2013.01); *Y02P 10/295* (2015.11)

(58) Field of Classification Search
CPC .......... B29C 67/0051; B29C 67/0085; B29C 67/0092; B29C 67/0081
USPC ............................... 264/401, 113, 118, 128
See application file for complete search history.

(56) References Cited

U.S. PATENT DOCUMENTS

| 4,247,508 A | 1/1981 | Housholder |
| 4,369,025 A | 1/1983 | Von Der Weid |
(Continued)

FOREIGN PATENT DOCUMENTS

| AU | 720255 B2 | 5/2000 |
| DE | 4300478 | 8/1994 |
(Continued)

OTHER PUBLICATIONS

US 4,937,420, 6/1990, Deckard (withdrawn).
(Continued)

*Primary Examiner* — Christina Johnson
*Assistant Examiner* — Xue Liu
(74) *Attorney, Agent, or Firm* — The Dobrusin Law Firm, P.C.

(57) ABSTRACT

The present invention relates to a method for producing three-dimensional components, using a three-dimensional printing method, an auxiliary structure being additionally formed beyond an extension of the one or more components during the construction of components. The invention also relates to an auxiliary structure for components produced by means of three-dimensional printing methods, the auxiliary structure being constructed along with the component and extending beyond a dimension of the one or more components.

14 Claims, 4 Drawing Sheets

(51) Int. Cl.
  *C22C 1/10*   (2006.01)
  *C22C 29/06*  (2006.01)
  *C22C 32/00*  (2006.01)

(56) References Cited

U.S. PATENT DOCUMENTS

| | | | |
|---|---|---|---|
| 4,575,330 A | 3/1986 | Hull | |
| 4,665,492 A | 5/1987 | Masters | |
| 4,752,352 A | 6/1988 | Feygin | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,059,266 A | 10/1991 | Yamane et al. | |
| 5,076,869 A | 12/1991 | Bourell et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,248,456 A | 9/1993 | Evans, Jr. et al. | |
| 5,252,264 A | 10/1993 | Forderhase et al. | |
| 5,263,130 A | 11/1993 | Pomerantz et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,431,967 A | 7/1995 | Manthiram et al. | |
| 5,482,659 A | 1/1996 | Sauerhoefer | |
| 5,490,962 A | 2/1996 | Cima et al. | |
| 5,506,607 A | 4/1996 | Sanders, Jr. et al. | |
| 5,555,176 A | 9/1996 | Menhennett et al. | |
| 5,573,055 A | 11/1996 | Melling et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,730,925 A | 3/1998 | Mattes et al. | |
| 5,740,051 A | 4/1998 | Sanders, Jr. et al. | |
| 5,753,274 A | 5/1998 | Wilkening et al. | |
| 5,807,437 A | 9/1998 | Sachs et al. | |
| 5,851,465 A | 12/1998 | Bredt | |
| 5,902,441 A | 5/1999 | Bredt et al. | |
| 5,902,537 A | 5/1999 | Almquist et al. | |
| 5,943,235 A | 8/1999 | Earl et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,116,517 A | 9/2000 | Heinzl et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,165,406 A | 12/2000 | Jang et al. | |
| 6,193,922 B1 * | 2/2001 | Ederer | 264/401 |
| 6,217,816 B1 | 4/2001 | Tang | |
| 6,259,962 B1 | 7/2001 | Gothait | |
| 6,305,769 B1 | 10/2001 | Thayer et al. | |
| 6,322,728 B1 | 11/2001 | Brodkin et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,467,525 B2 | 10/2002 | Herreid et al. | |
| 6,476,122 B1 | 11/2002 | Leyden | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,733,528 B2 | 5/2004 | Abe et al. | |
| 6,838,035 B1 | 1/2005 | Ederer et al. | |
| 7,004,222 B2 | 2/2006 | Ederer et al. | |
| 7,137,431 B2 | 11/2006 | Ederer et al. | |
| 7,204,684 B2 | 4/2007 | Ederer | |
| 7,531,117 B2 | 5/2009 | Ederer | |
| 7,665,636 B2 | 2/2010 | Ederer | |
| 7,736,578 B2 | 6/2010 | Ederer | |
| 7,748,971 B2 | 7/2010 | Hochsmann | |
| 7,767,130 B2 | 8/2010 | Elsner | |
| 2001/0050031 A1 | 12/2001 | Bredt et al. | |
| 2002/0026982 A1 | 3/2002 | Bredt et al. | |
| 2002/0111707 A1 | 8/2002 | Li et al. | |
| 2003/0083771 A1 | 5/2003 | Schmidt | |
| 2004/0012112 A1 | 1/2004 | Davidson et al. | |
| 2004/0035542 A1 | 2/2004 | Ederer et al. | |
| 2004/0056378 A1 | 3/2004 | Bredt et al. | |
| 2004/0094058 A1 | 5/2004 | Kasperchik et al. | |
| 2004/0187714 A1 | 9/2004 | Napadensky et al. | |
| 2004/0239009 A1 * | 12/2004 | Collins et al. | 264/497 |
| 2005/0017394 A1 | 1/2005 | Hochsmann et al. | |
| 2005/0167872 A1 | 8/2005 | Tsubaki et al. | |

FOREIGN PATENT DOCUMENTS

| | | |
|---|---|---|
| DE | 4400523 | 7/1995 |
| DE | 4440397 | 9/1995 |
| DE | 19511772 A1 | 10/1996 |
| DE | 19723892 C1 | 9/1998 |
| DE | 19846478 C2 | 4/2000 |
| DE | 19853834 | 5/2000 |
| DE | 10047614 | 4/2002 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0968776 | 1/2000 |
| EP | 1163999 | 12/2001 |
| EP | 1415792 | 5/2004 |
| EP | 1442870 | 8/2004 |
| EP | 1486318 A | 12/2004 |
| EP | 1486318 A2 * | 12/2004 |
| FR | 2790418 | 9/2000 |
| GB | 2382798 | 6/2003 |
| JP | 2003-136605 A | 5/2003 |
| JP | 2003136605 A * | 5/2003 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 02/26419 A1 | 4/2002 |
| WO | 02/26420 A1 | 4/2002 |
| WO | 02/26478 A1 | 4/2002 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 03/103932 A1 | 12/2003 |
| WO | 2004/010907 A1 | 2/2004 |
| WO | 2004/110719 A2 | 12/2004 |
| WO | 2004/112988 A2 | 12/2004 |
| WO | 2005/113219 A1 | 12/2005 |

(56) References Cited

FOREIGN PATENT DOCUMENTS

OTHER PUBLICATIONS

Cima et al., "Computer-derived Microstructures by 3D Printing: Bio- and Structural Materials," SFF Symposium, Austin, TX, 1994.
EOS Operating Manual for Laser Sintering Machine with Brief Summary.
Sachs et al., "Three-Dimensional Printing: Rapid Tooling and Prototypes Directly from a CAD Model", Massachusetts Institute of Technology, pp. 131-136.
Sachs et al., "Three-Dimensional Printing: Rapid Tooling and Prototypes Directly from a CAD Model", Massachusetts Institute of Technology, pp. 143-151.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal.
Williams, "Feasibility Study of Investment Casting Pattern Design by Means of Three Dimensional Printing", Department of Machanical Engineering, pp. 2-15.
International Search Report, WO 04/110719, Jan. 11, 2005.
Gephart, Rapid Prototyping, pp. 118-119.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
International Search Report, PCT/DE00/03324, (Published as WO2002/026419), Jun. 5, 2001.
International Search Report, PCT/DE01/03661, (Published as WO2002/026420), Feb. 28, 2002.
International Search Report, PCT/DE01/03662, (Published as WO2002/026478), Mar. 1, 2002.
Marcus, et al., Solid Freeform Fabrication Proceedings, Sep. 1995, p. 130-33.
International Search Report, Application No. PCT/DE2008/0017073 dated Nov. 6, 2009.
Office Action from the European Patent Office, Application No. 08784270.4 dated Jul. 6, 2011.
Office Action from the European Patent Office, Application No. 08784270.4 dated Sep. 5, 2013.

\* cited by examiner

METHOD FOR PRODUCING THREE-DIMENSIONAL COMPONENTS

CLAIM OF PRIORITY

The present application claims priority from German Application No. DE 102007033434, filed on Jul. 18, 2007 and is the National Phase of PCT Application PCT/DE2009/001073, filed on Aug. 6, 2007, disclosure of which is hereby incorporated by reference herein.

FIELD OF THE INVENTION

The present invention relates to a method for producing three-dimensional components, using a three-dimensional printing method.

BACKGROUND

Methods for producing three-dimensional components have been known for some time.

For example, a method for producing three-dimensional objects from computer data is described in the European patent specification EP 0 431 924 B1. In this method, a particulate material is deposited in a thin layer onto a platform, and a binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which the remaining power is removed, for example by brushing.

Other powder-supported rapid prototyping processes work in a similar manner, for example selective laser sintering or electron beam sintering, in which a loose particulate material is also deposited in layers and selectively solidified with the aid of a controlled physical radiation source.

All these methods are referred to collectively below as "three-dimensional printing method" or "3D printing method".

In all of these three-dimensional printing methods, the loose, unsolidified particulate material supports the structural body during and after construction of the structural body. However, additional support structures, which are necessary, for example, in a different layering method (the so-called stereolithographic method), are usually not required in the 3D printing method.

This characteristic has so far been regarded as a great advantage of the 3D printing method, since manual post-processing of the components is not required in order to remove any support structures.

However, if a method such as powder-supported rapid prototyping is used in order to produce a larger number of objects, a variety of problems may potentially arise.

After they are completed, the parts are entirely covered by loose particulate material and are therefore initially not visible to the operator. If the operator uses an extractor to remove the loose particulate material, the produced objects are in danger of being damaged by the suction nozzle. In the case of small parts, in particular, the parts are also in danger of being unintentionally drawn into the suction nozzle.

Large, filigree structures may also be damaged after production when they are removed from the powder bed, if parts of the object are still located in the powder bed and are somewhat more difficult to remove.

It is also possible for components to become dislodged and slip or collapse under their own weight if the loose particulate material beneath the component is carelessly removed.

For all of these reasons, it has not yet been possible to automate the removal of the components from the powder bed.

SUMMARY OF THE INVENTION

An object of the present invention is therefore to provide a method and a device which make it possible to easily and safely remove any 3D-printed object from the loose particulate material.

According to the invention, this object is achieved by a method for producing three-dimensional components using a three-dimensional printing method, an auxiliary structure additionally being formed beyond the extension of the one or more components during the construction of components.

The object is also achieved by an auxiliary structure according to the invention for components produced by means of three-dimensional printing methods, the auxiliary structure being constructed along with the component and extending beyond a dimension of the one or more components.

By additionally constructing an auxiliary structure of this type, it is a great deal easier to handle potentially small and filigree-structured components.

According to a preferred embodiment of the method according to the invention, the auxiliary structure is additionally constructed in such a way that two simultaneously constructed components are interconnected directly or indirectly by the auxiliary structure.

In such an embodiment of the present invention, it potentially become even easier to handle the produced components, since multiple components may be removed at the same time. This may be advantageous, in particular, if the components are relatively small.

In a method according to the invention, the auxiliary structure may advantageously include materials of the component.

Such an embodiment of the method according to the invention makes it easy to construct the auxiliary structure and also requires only a reasonable amount of additional time to construct the auxiliary structure.

According to a particularly preferred embodiment of the present method, the auxiliary structure is largely formed from the same material as the one or more components. This potentially makes it particularly easy to additionally build the auxiliary structure.

According to a particularly preferred embodiment of the method according to the invention, multiple layers of components are formed on top of each other. This means that, during a single build process, multiple components may be formed not only next to each other, but also on top of each other. In the event that particularly small or even only particularly flat components are to be constructed, this is a possible embodiment of the method.

The auxiliary structure may have any conceivable shape. However, it may be advantageous if, in the event that multiple components are produced on top of each other, a separate auxiliary structure containing all components on a layer is formed on each layer of components.

In the method, as described according to the invention, it is possible according to an embodiment of the present invention to form the component and the auxiliary structure with the aid of particulate materials deposited in layers and by adding a further material or by selectively applying energy.

According to the method, the auxiliary structure is preferably formed in such a way that it is connected to at least one component. It is therefore also conceivable that in some embodiments it is advantageous to interconnect all components of a manufacturing process.

It may also be advantageous to form predetermined break points at junctions between the component and auxiliary structure in the method according to the invention.

According to an embodiment of the invention, it has also proven to be helpful if the auxiliary structure further forms a holder or coupling device, since this makes it particularly easy to handle the formed components. A holding device of this type may be a holder for a handling tool.

A further improvement achievable by an auxiliary structure according to the present invention is that the auxiliary structure may enable the handling of components to be automated.

To make the components particularly easy to handle, the auxiliary structure, according to one embodiment, connects at least two component on a component layer.

It may also prove to be particularly advantageous if the auxiliary structure interconnects all constructed components. This makes it particularly easy to remove the components after they have been completed, and this may be done in a single operation.

According to an embodiment of the invention, it may be useful to always orient the auxiliary structure on one side of the build cylinder in order to have a uniform starting point for any removal devices and then to group the desired components on this side, which saves space. Due to known build time considerations, it would then be possible for the rest of the auxiliary structure to follow the contours of the components as closely as possible.

It would be possible to connect the auxiliary structure directly to the one or more components.

A further possibility would be to connect the auxiliary structure indirectly to the one or more components, for the auxiliary structure does not necessary have to be integrally connected to the component. Embodiments are also conceivable in which the auxiliary structure holds the component in a positive fit or is even positioned a short distance away from the component, permitting slight movements of the component.

It may also be possible to design the auxiliary structure as a kind of lattice box surrounding the component, which has only thin strips for separating the space segments.

According to a particularly preferred embodiment of the present invention, the determination of the suitable auxiliary structure should be automated as much as possible in process-preparing software.

For example, a possible workflow would be to place the parts to be built in the virtual build space, using a computing program. In a subsequent step, the operator marks the positions on the components for connecting the auxiliary structure. The process software subsequently computes the optimized auxiliary structure and also dimensions it on the basis of the available data relating to component volume and therefore weight.

Next, the entire build space, including the auxiliary structure, is divided into the desired layers, and this data is then transferred to the layering process, which enables the component and the auxiliary structure to be constructed by means of the desired 3D printing method.

The auxiliary structure may also be used to facilitate component identification, for example by applying component numbers or component codes to the strips for the corresponding components. These codes may be provided, for example, in machine-readable form so that they may be supplied to an automated evaluation system.

According to a further embodiment of the invention, a method for producing three-dimensional components from a particulate base material is provided. The base material is deposited in layers and subsequently connected selectively along a contour of the component predetermined by a controller by adding a further material or applying energy. The component is completed by repeating this operation multiple times. In the present case, an auxiliary structure is preferably constructed along with the component, and this auxiliary structure holds the one or more components to be constructed in the desired position within the build space even without the supporting effect of the surrounding powder material.

If, according to a particularly preferred embodiment of the present invention, the auxiliary structure has a different color than the component, it may be, for one thing, particularly easy to handle the components, since it is very easy even for a machine to determine what the auxiliary structure represents and where it should be possible to grip the formed structure.

For the purpose of more detailed explanation, the invention is described in further detail below on the basis of preferred embodiments with reference to the drawing.

DETAILED DESCRIPTION OF THE INVENTION

Figure 1:
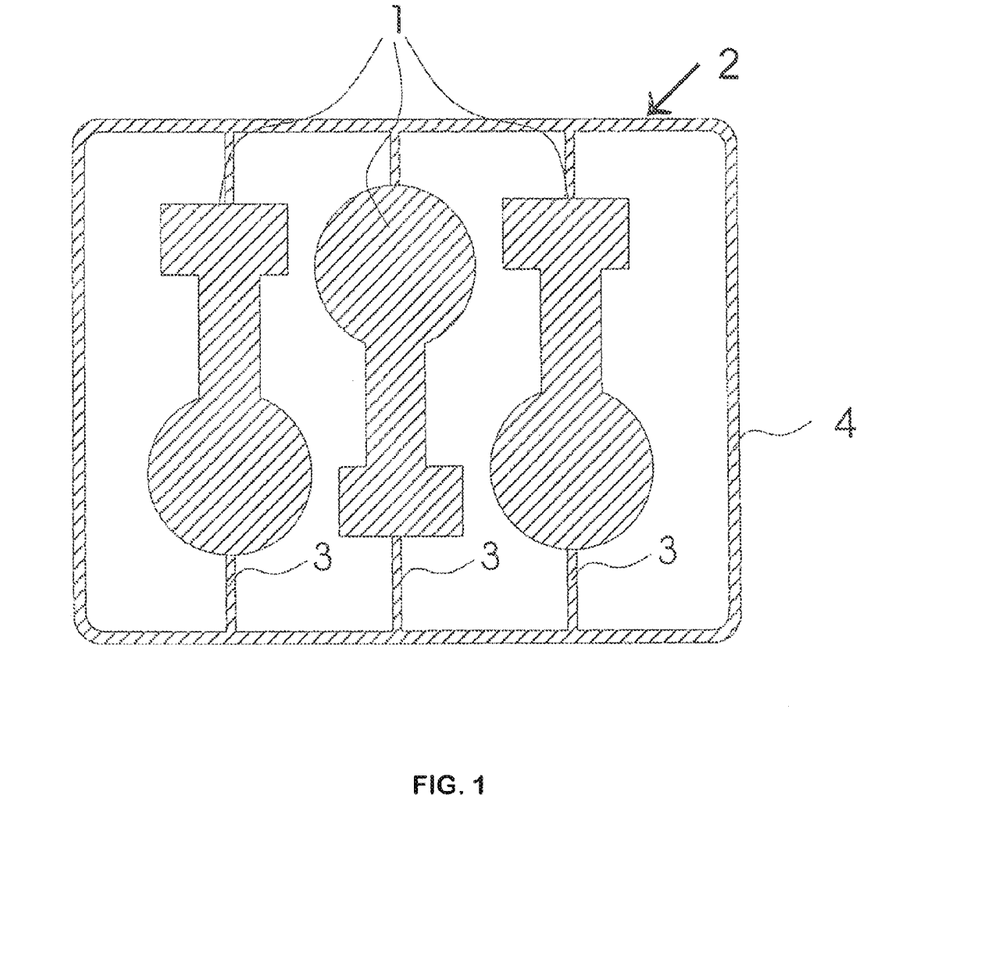
FIG. 1 shows an auxiliary structure designed as a frame according to a first preferred embodiment of the present invention.

FIG. 1 shows a top view of a connection of multiple components 1 having an auxiliary structure 2, auxiliary structure 2 including a frame 4 surrounding components 1. Components 1 are connected to frame 4 by strips 3.

According to the embodiment of the invention illustrated in FIG. 1, auxiliary structure 2 includes frame 4, which surrounds components 1 on a plane and is connected to the individual components by strips 3. Frame 4 is dimensioned in such a way that all components 1 connected thereto are held on this frame 4 by the force of their own weight without damaging the frame.

To limit the amount of powder consumed, it is possible to provide at least part of auxiliary structure 2 with a non-solid design. For example, it would be possible to produce at least part of frame 4 from hollow or open profiles whose interiors may be accessible to cleaning agents via corresponding openings.

For example, frame 4 may have a rectangular cross section; however other cross sections, such as round or oval ones, are also conceivable without further limitation.

To shorten the build time for auxiliary structure 2, it may be advantageous, according to a preferred embodiment of the invention, to position auxiliary structure 2 as closely as possible to components 1 and thereby give it a minimal dimension.

Figure 2:
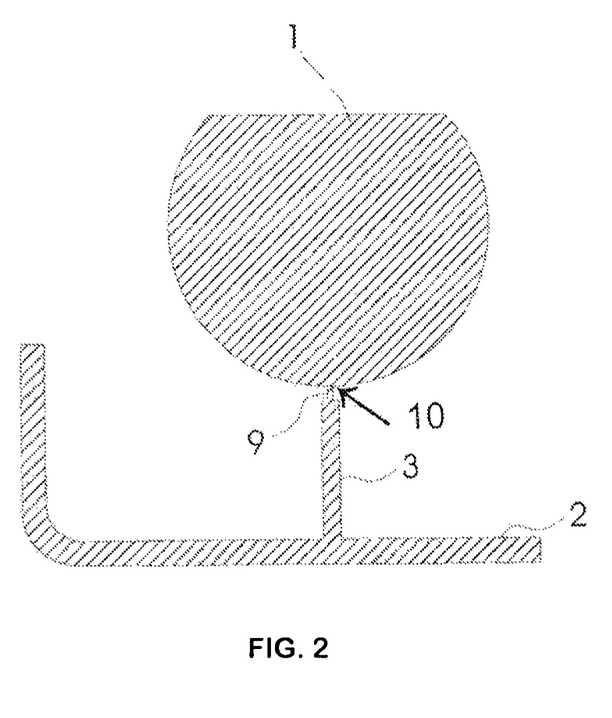
FIG. 2 shows a possible shape of an auxiliary structure for connection to the components, according to a further embodiment of the present invention.

FIG. 2 shows a possible means of connecting an auxiliary structure 2 to a component 1 according to a further embodiment of the present invention.

To limit post-processing work for removing strips 3 or the contact points of strips 3 on component 1, it may be advantageous to provide auxiliary structure 2 with a minimal number of connecting points 10 to components 1.

Strips 3, along with their connecting points 10, may be designed with so-called predetermined break points 9 to facilitate removal, these predetermined break points being provided with a geometrically defined constriction 9, as illustrated by way of example in FIG. 2.

Alternatively or in addition, it would also be possible to produce predetermined break point 9 by reducing the solidity, for example by reducing the binder deposit.

Connecting points 10 are also preferably located at points on components 1 which do not require an exact surface. It is thus undesirable for a poorly placed connecting point to mar the visual appearance.

Preferred locations for connecting points 10 may be, for example, on the rear or inside surfaces of component 1. However, when selecting connecting points 10, it is also important to ensure that accessibility is maintained and that the connections may be removed without residue. For this reason, outwardly curved surfaces are potentially more suitable, since they are more easily accessible than inwardly curved surfaces.

The number of connecting points 10 should preferably also be selected in such a way that they are sufficient to hold connected component 1 in any position by the force of its own weight and, if possible, also under the influence of weaker or stronger additional forces following post-processing work.

Figure 3:
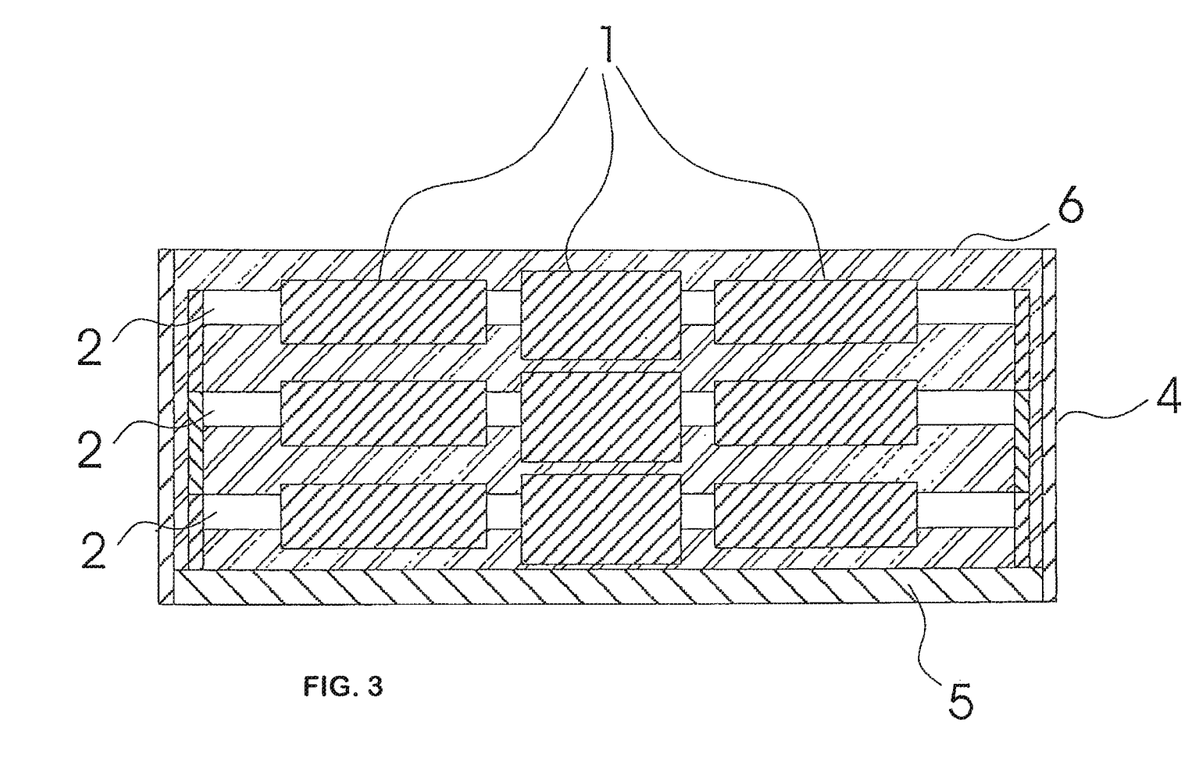
FIG. 3 shows a system of multiple components in a build cylinder according to a third preferred embodiment of the method according to the invention.

FIG. 3 shows a system of multiple components 1 in a build cylinder 4 after components 1 have been constructed, according to a further preferred embodiment of the method according to the invention.

In 3D printing as well as in other RP methods, it is possible to produce components in multiple layers on top of each other, depending on the component size and component shape. Access to the individual layers is usually only from one side, ordinarily from the side on which the particulate material is introduced.

In order to reach the underlying components, the top components must first be removed.

As shown in FIG. 3, it may therefore be advantageous to divide components 1 and associated auxiliary structures 2 into different planes which, if necessary, run parallel to the layering plane. This enables the individual "component planes" to be removed easily and successively.

Auxiliary structures 2 of the individual planes should preferably be easily separated from each other and nevertheless be fixable in place without supporting powder material.

Depending on the component size and component weight, it would also be conceivable to interconnect the components on different component planes via the auxiliary structure.

It may also be advantageous if the auxiliary structure interconnects the component additionally or exclusively in a direction perpendicular to the layering direction, instead of in a direction parallel to the layering direction.

Connecting the components to an auxiliary structure makes it possible to use automated removal and cleaning methods. This is currently made difficult by the fact that the components are usually designed individually and have no holding means, for example for robot grippers. The use of simple gripping mechanisms would quickly cause damage to the components.

Figure 4:
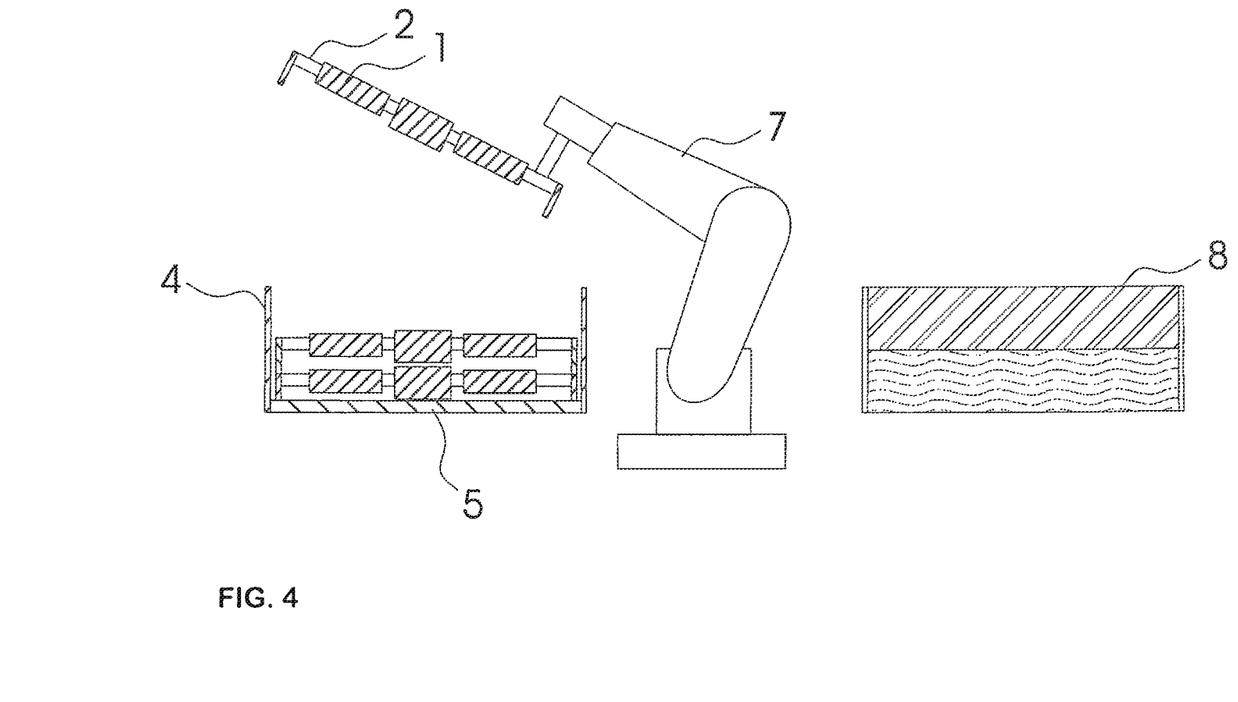
FIG. 4 shows an automated means of removing components provided with auxiliary structures.

FIG. 4 shows an automated means of removing components 1 provided with auxiliary structures 2, which is made possible through the use of the auxiliary structures.

By using auxiliary structure 2, it is possible, according to an embodiment of the present invention, to define a uniform holding means for automatic removal or cleaning or post-processing.

A robot 7 would be able to successively remove an auxiliary structure 2 provided with a frame and including components 1 and to supply them to a post-processing process such as cleaning.

Loose particle material 6 may also be more easily removed, for example by removing at least a portion of base 5 of the vessel where the layering process took place, or if the base has closable openings which are opened at the end of the process, and if the loose particulate material, which has a sufficient fluidity, flows out through the base openings.

According to this technique, components 1 are held in the predetermined position by auxiliary structure 2 and are not carried along by outflowing particulate material 6.

However, it would also be possible to remove loose particulate material 6 via the upper opening in the build container, for example by tilting the entire build container in order to pour out loose particulate material 6. If auxiliary structure 2 is held in place on the build cylinder, for example by clamps, components 1, including auxiliary structure 2, remain in the predefined position is not impaired by this operation and are therefore also not damaged.

It would also be possible to extract loose particulate material 6, as is known from the prior art. A suction lance may be positioned over the powder feedstock from above, or the suction lance is inserted directly into the powder feedstock, and the loose particulate material then flows to the suction nozzle. In both cases, components 1 remain in a desired position due to auxiliary structure 2, and they are therefore not unintentionally extracted or damaged.

After a large part of loose particulate material 6 has been removed, components 1, including auxiliary structure 2, may be removed from the build container and supplied to a further cleaning process. This may be done using compressed air or compressed air combined with blasting media. In this case, auxiliary structure 2 again enables components 1 to remain in a desired position and the cleaning agents to be passed over components 1. This operation may be carried out manually or automatically. For example, it would be conceivable to use an automatic cleaning system into which multiple standardized auxiliary structure frames 4, including components 1, are introduced, and by means of which components 1 may be cleaned of remaining residual particulate material 6 in a closed process chamber, using a fluid medium such as compressed air.

Particulate material 6 separated from component 1 may then be supplied to a separator via a process chamber extraction system and fed back into the build process.

The strong flow rates needed in an automatic cleaning system of this type require components 1 to be sufficiently fixed in place, which may be accomplished with the aid of auxiliary structure 2.

After cleaning, components 1 may have to be infiltrated in order to achieve certain material properties. This may be accomplished by immersing the components into a tank filled with fluid infiltration medium 8.

This operation may be greatly facilitated by auxiliary structure 2, since multiple components 1 may be easily held at once and thus also safely immersed at once. In this case, it is also possible to easily automate the operation by introducing one or more frames, for example into a lattice box, and then immersing them together with the lattice box into infiltration tank 8, as shown, for example, in FIG. 4. Of course, it is also conceivable to automate the immersion of individual "component layers".

Finally, components 1 must be separated from auxiliary structure 2.

It is helpful to distinguish the auxiliary structure from the component with the aid of colors, which may be accomplished, for example, by applying additional dye during the 3D printing process or by means of a modified chemical reaction via overhardening or underhardening. A distinction may also conceivably be made by means of a particular surface structure which is used only in the auxiliary structure.

What is claimed is:

1. A method for producing two or more three-dimensional components, using a three-dimensional printing method, wherein an auxiliary structure is additionally formed beyond an extension of the two or more components during the construction of components, and this auxiliary structure lies at least partially outside a projection area of the two or more components projected onto a build platform and does not come into direct contact with the build platform, wherein the three-dimensional printing method includes repeatedly, i) depositing a layer of particulate material; and ii) selectively printing a binder material on the particulate material, until a desired height is achieved;
wherein the auxiliary structure is additionally constructed in such a way that at least two simultaneously constructed components are connected to each other.

2. A method for producing one or more three-dimensional components, using a three-dimensional printing method, wherein an auxiliary structure is additionally formed beyond an extension of the one or more components during the construction of components, and this auxiliary structure lies at least partially outside a projection area of the one or more components projected onto a build platform and does not come into direct contact with the build platform, wherein the three-dimensional printing method includes repeatedly, i) depositing a layer of particulate material; and ii) selectively printing a binder material on the particulate material, until a desired height is achieved; wherein multiple layers of components are formed and a separate auxiliary structure is formed on each layer of components.

3. A method for producing one or more three-dimensional components, using a three-dimensional printing method, wherein an auxiliary structure is additionally formed beyond an extension of the one or more components during the construction of components, and this auxiliary structure lies at least partially outside a projection area of the one or more components projected onto a build platform and does not come into direct contact with the build platform, wherein the three-dimensional printing method includes repeatedly, i) depositing a layer of particulate material; and ii) selectively printing a binder material on the particulate material, until a desired height is achieved; wherein predetermined break points are formed at junctions between the component and auxiliary structure.

4. A method for producing a plurality of three-dimensional components including first and second three-dimensional components comprising the steps of:
   i) printing the three-dimensional components on a build platform by a three-dimensional printing method, wherein the three-dimensional printing method includes repeatedly:
      a. providing a layer of particulate material, and
      b. selectively printing a binder on the particulate material;
   ii) forming an auxiliary structure by the three-dimensional printing method, wherein the auxiliary structure is formed beyond an extension of the plurality of components during the construction of components, wherein the auxiliary structure lies at least partially outside a projection area of the plurality of components projected onto the build platform and does not come into direct contact with the build platform, wherein the first and second components are connected to the auxiliary structure; and
   iii) separating the first and second components from the auxiliary structure.

5. The method of claim 4, wherein the first and second components are constructed simultaneously and the auxiliary structure is largely formed from the same material as the first and second components.

6. The method of claim 5, wherein the auxiliary structure is directly connected to the first and second components.

7. The method of claim 6, wherein the auxiliary structure is oriented on one side of the build platform.

8. The method of claim 7, wherein multiple layers of components are formed.

9. The method of claim 8, wherein a separate auxiliary structure is formed on each layer of components.

10. The method of claim 1, wherein the one or more components and the auxiliary structure are formed from the same particulate material and binder material during the three-dimensional printing.

11. The method of claim 10, wherein the one or more components includes a first component connected to a second component by the auxiliary structure.

12. The method of claim 11, wherein a portion of the particulate material between the first component and the second component is loose particulate material and the method includes separating the particulate material from the first component, the second component, and the auxiliary structure.

13. The method of claim 2, wherein
   the one or more components and the auxiliary structure are formed from the same particulate material and binder material during the three-dimensional printing;
   the one or more components includes a first component connected to a second component by the auxiliary structure;
   a portion of the particulate material between the first component and the second component is loose particulate material; and the method includes separating the particulate material from the first component, the second component, and the auxiliary structure.

14. The method of claim 3, wherein the one or more components and the auxiliary structure are formed from the same particulate material and binder material during the three-dimensional printing;

the one or more components includes a first component connected to a second component by the auxiliary structure;

a portion of the particulate material between the first component and the second component is loose particulate material; and the method includes separating the particulate material from the first component, the second component, and the auxiliary structure.

* * * * *